Figure 3:
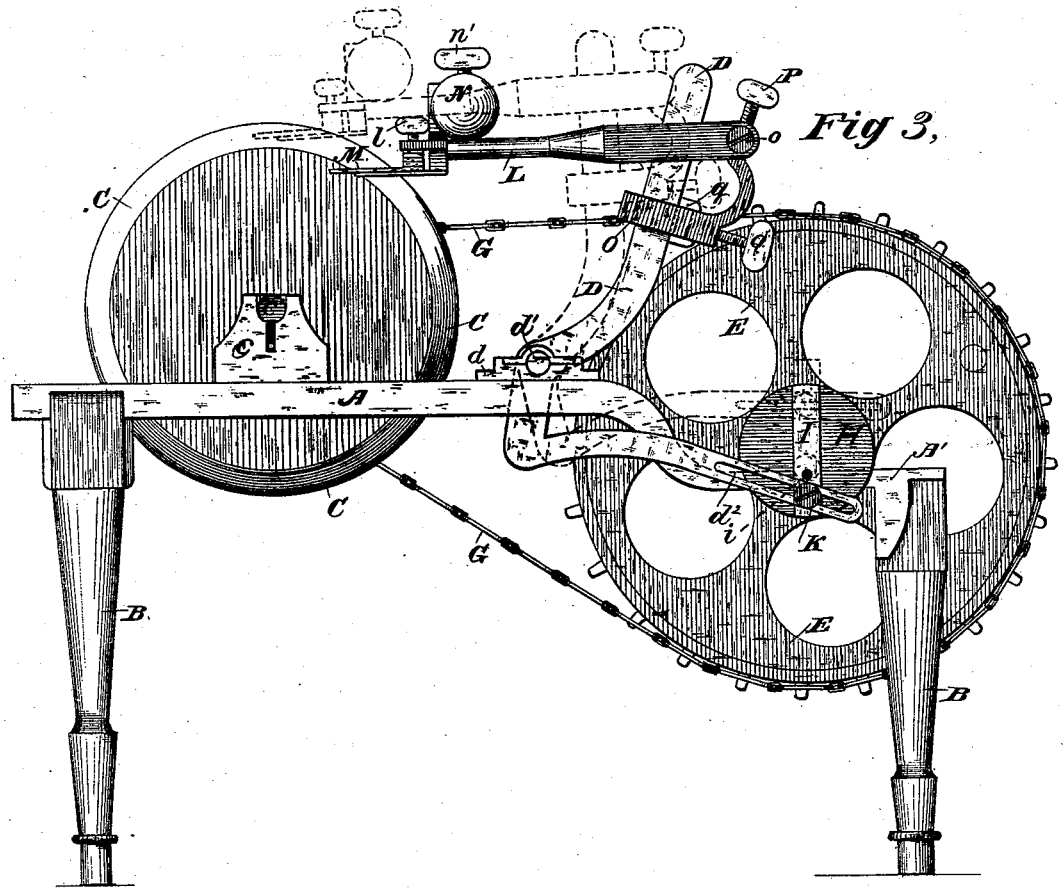

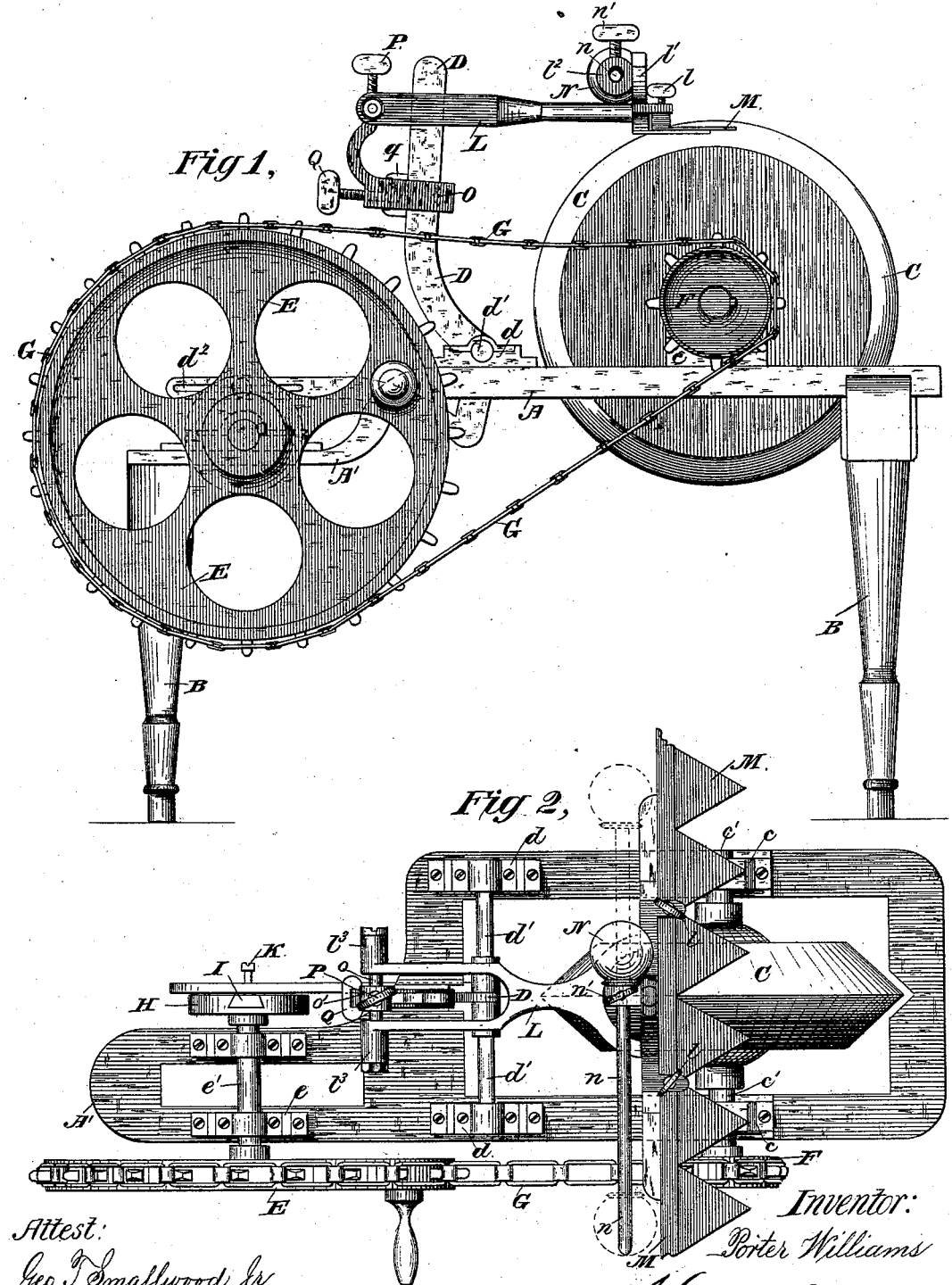

(No Model.) 2 Sheets—Sheet 2.

P. WILLIAMS.
Machine for Sharpening Reaper and Mower Knives.

No. 236,287. Patented Jan. 4, 1881.

Attest:
Geo. T. Smallwood Jr.
Walter Allen

Inventor:
Porter Williams
By Knight Bros
Attys

UNITED STATES PATENT OFFICE.

PORTER WILLIAMS, OF PLAINWELL, ASSIGNOR OF ONE-HALF TO JAMES A. FOSTER, OF DETROIT, MICHIGAN.

MACHINE FOR SHARPENING REAPER AND MOWER KNIVES.

SPECIFICATION forming part of Letters Patent No. 236,287, dated January 4, 1881.

Application filed October 15, 1880. (No model.) Patented in Canada March 22, 1880.

*To all whom it may concern:*

Be it known that I, PORTER WILLIAMS, a citizen of the United States, residing at Plainwell, in the county of Allegan and State of Michigan, have invented an Improvement in Machines for Sharpening Mower and Reaper Knives, of which the following is a specification.

My invention relates to improvements in those machines in which the knife is moved back and forth on a rotating beveled stone.

My improvement consists, first, in mounting the knife-holder on an oscillating L-shaped lever adapted to impart a reciprocating horizontal movement to the knife while it is raised and lowered, thus keeping the knife level while it follows the curve of the stone.

My improvement consists, further, in combining with the lever a vertically and laterally adjustable knife-holder.

In order that my invention may be fully understood, I will proceed to describe it, with reference to the accompanying drawings, in which—

Figure 1 is a side view of my improved device. Fig. 2 is a top view thereof, showing positions the counterbalance-weight can assume. Fig. 3 is a view of the opposite side of the device, showing the forward position of the knife-holder and lever in dotted lines.

A represents a suitable supporting-frame, having a lower end, A', and provided with supports B. The elevated portion of the frame A is furnished with bearing-blocks $c$, for the shaft $c'$ of a beveled stone, C, and bearing-blocks $d$, for the shaft $d'$ of an L-shaped lever, D. On the lower portion of the frame are bearing-blocks $e$, for the shaft $e'$ of a driving rag-wheel, E, operating on another rag-wheel, F, on the outer end of the shaft $c'$ by means of a chain, G, to impart motion to the stone. On the inner end of the shaft $e'$ is a crank-disk, H, provided with a slide, I, having holes $i$, through which works a wrist-pin, K, adapted to clamp the slide in different positions and work in a slot, $d^2$, in the outer end of the lever D.

L is the holder, which receives the knife, M, to be ground. The knife is held by suitable clamp-screws $l$. $l'$ is an upright or standard, provided with a socket, $l^2$, through which passes the supporting-rod $n$ of a counterbalance-weight, N, secured in any desirable position by set-screw $n'$. The rear end of the holder L is bifurcated and formed with knuckles $l^3$, through which is passed a pintle or bolt, $o$, which connects it with knuckle $o'$ of vertically-adjustable box O on the lever D. Space is left between the knuckles $l^3$ $l^3$ and $o'$, to permit of the lateral adjustment of the holder, which is held in desired position by set-screw P. The box O is clamped to the lever D by means of set-screw Q, working on key $q$.

By loosening the wrist-pin K and adjusting the slide I to or from the center of the crank-disk, knives of different lengths and widths of sections can be ground.

Cog-wheels or pulleys and belt may be used instead of chain-wheels and belt.

The knife-holder being adapted to move from side to side, only one side of a section can be sharpened at a time, if desired.

On turning the rag-wheel E motion is communicated to the crank-disk H, and by chain G to the wheel F and stone C. The wrist-pin K on the disk H passes along the slot $d^2$ in outer end of lever D, and moves the lever and knife M back and forth and up and down, so as to follow the curve of the stone.

Having thus described my invention, the following is what I claim as new therein and desire to secure by Letters Patent:

1. The L-shaped lever D and knife-holder, in combination with driving-wheel E and crank-disk H, as and for the purpose set forth.

2. The L-shaped lever D, having slot $d^2$, in combination with adjustable slide I and wrist-pin K of rotating disk H, as set forth.

3. The knife-holder L, laterally adjustable, and vertically-adjustable box O, in combination with the oscillating lever D, as set forth.

4. The combination of the laterally-adjustable knife-holder L and counterbalance-weight N $o$, as set forth.

5. The combination of frame A A', rag-wheels E F, chain G, stone C, lever D, and knife-holder L, as set forth.

PORTER WILLIAMS.

Witnesses:
P. J. EDMUNDS,
FRANK G. WESTLAKE.